US007289814B2

(12) United States Patent
Amir et al.

(10) Patent No.: US 7,289,814 B2
(45) Date of Patent: Oct. 30, 2007

(54) SYSTEM AND METHOD FOR DETECTING PROXIMITY BETWEEN MOBILE DEVICE USERS

(75) Inventors: Arnon Amir, Saratoga, CA (US); Alon Efrat, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1012 days.

(21) Appl. No.: 10/405,829

(22) Filed: Apr. 1, 2003

(65) Prior Publication Data

US 2004/0198398 A1 Oct. 7, 2004

(51) Int. Cl.
*H04Q 7/38* (2006.01)
*H04M 3/42* (2006.01)

(52) U.S. Cl. .............................. 455/456.1; 340/539.13; 379/201.06; 455/456.5; 455/456.6

(58) Field of Classification Search ........... 340/539.13; 379/201.06–201.1; 455/456.1–456.3, 456.5, 455/456.6
See application file for complete search history.

(56) References Cited

U.S. PATENT DOCUMENTS

| 6,327,535 | B1 | 12/2001 | Evans et al. ................ 701/300 |
| 6,347,095 | B1 | 2/2002 | Tang et al. .................. 370/469 |
| 6,539,232 | B2 * | 3/2003 | Hendrey et al. ......... 455/456.1 |
| 6,542,748 | B2 * | 4/2003 | Hendrey et al. ......... 455/456.1 |
| 6,542,750 | B2 * | 4/2003 | Hendrey et al. ......... 455/456.1 |
| 6,639,516 | B1 * | 10/2003 | Copley .................... 340/573.4 |
| 7,058,385 | B2 * | 6/2006 | Lauper .................... 455/404.1 |
| 2002/0057283 | A1 | 5/2002 | Biswas et al. .............. 345/700 |
| 2002/0086676 | A1 | 7/2002 | Hendrey et al. ............ 455/445 |
| 2002/0107008 | A1 | 8/2002 | Hendrey et al. ............ 455/416 |
| 2002/0111173 | A1 | 8/2002 | Hendrey et al. ............ 455/456 |
| 2002/0114350 | A1 | 8/2002 | Tang et al. ................. 370/469 |

FOREIGN PATENT DOCUMENTS

WO WO99/23623 5/1999

OTHER PUBLICATIONS

Roy Want et al., "The Active Badge Location System," ACM Transactions on Information Systems, vol. 10, No. 1, Jan. 1992, pp. 91-102.

(Continued)

*Primary Examiner*—Harry S. Hong
(74) *Attorney, Agent, or Firm*—Cantor Colburn LLP; Pete Tennet

(57) ABSTRACT

A system and method are provided to alert two mobile communications users in the event they come in close proximity to one another. The present system uses a distributed algorithm denoted as the Strips algorithm, in which a pair of moving friends with mobile telecommunications devices makes an agreement about a static buffering region between them. After the agreement is made, the users do not need to follow each other's location until one of them enters the buffering region for the first time. By doing so, they invalidate the agreement. Consequently, they replace a location update message between them, determine if they got within the vicinity of each other, and otherwise make a new agreement on a new buffering region. When one of them enters the buffering region for the first time, a message is sent to both friends alerting them of the proximity of the other.

20 Claims, 13 Drawing Sheets

OTHER PUBLICATIONS

Justin Lin, "Locator: Increasing Location Awareness," Massachusetts Institute of technology 2002.

Matthew A. Peretz, "ATT Wireless' mMode Lets User 'Find Friends'," http://WWW.allnetdevices.com/wireless/news/2002/06/27/att_wireless.html, available on the Internet as of Oct. 9, 2002.

Alexander Leonhardi et al., "A Comparison of Protocols for Updating Location Information," Mar. 2000.

Dieter Pfoser et al., "Querying the Trajectories of On-Line Mobile Objects," A Time Center Technical Report, Jun. 6, 2001.

Julien Basch et al. "Data Structures for Mobile Data," Proceedings of the Eighth Annual ACM-SIAM Symposium on Discrete Algorithms 1997, pp. 747-756.

Prasad Sistlaa et al. "Modeling and Querying Moving Objects," Proceedings of the IEEE International Conference on Data Engineering, (ICDE) pp. 422-452, Birmingham UK, Apr. 1997.

Simonas Saltenis et al., "Indexing the Position of Continuously Moving Objects," Technical Report R-99-5009, Dept. of Computer Science, Aalborg University, 1999.

* cited by examiner

SYSTEM AND METHOD FOR DETECTING PROXIMITY BETWEEN MOBILE DEVICE USERS

FIELD OF THE INVENTION

The present invention relates to the field of location dependent data processing, and particularly to a software system and associated method for use with a Personal Digital Assistant (PDA) combined with a Global Positioning System (GPS) locator, and an integrated software suite suited to permit the implementation of proximity and/or location driven activities.

BACKGROUND OF THE INVENTION

Global positioning systems and mobile phone networks are making it possible to track individual users with an increasing accuracy. One attractive application of knowing the geographic location of users is to compute and maintain social networks. In these networks, each user specifies a group of other users, called the user's friends. Whenever a friend moves into the user's vicinity, both users are notified by an alert message. In a more general context, a social group is one that is predefined by enrollment or by matching the personal profiles of users. A group may refer to a list of individuals but also to other groups of individuals.

The problem of maintaining social networks is a form of a dynamic query into a database of multiple geographic entities. In some applications, this could as well be part of a "find" query, coupled with other properties, such as profession, employer, user profile or calendar scheduling constraint. A natural example is of a traveling businessman who attends a large conference and would like to be alerted of and possibly meet other colleagues if they happened to be around. Other examples could be a roadside service, where service cars need to be dynamically assigned to new customers, or a surveillance system tracking suspects and directing security people.

Two different computational frameworks could be used in creating a social network. In the centralized computation model, users send their location information to a centralized server that keeps track of user locations and lists of friends and is responsible for computing and sending the alert messages to all pairs of friends. The peer-to-peer computation model involves no central server. Instead, each pair of friends is responsible for keeping each other informed about their location, detecting vicinity events, and transmitting alert messages.

Under both frameworks there is need for communication resources as well as computational resources. Communication is required to deliver location updates and alerts. The amount of communication is characterized by the number of messages being replaced, assuming that all the messages are of fixed length (i.e., location update of k users, for example, would require O(k) messages). Communication complexity affects the required amount of air time. In a simple cost model, a message between two users could be assumed to cost the same as a message between a user to a centralized server. More elaborate cost modes may be applied.

In addition, computational resources are needed, either on the server or on the participating moving devices, to keep and maintain data structures and to detect meeting alerts. Minimization of air time is critical as air time is typically the more expensive component of the two in building a real system. However, this relationship may depend on other considerations.

There are several considerations that impact both computational and communication complexities. A major consideration is the maximal velocity of users and the desired time/distance accuracy of alerts. For example, two users wish to receive an alert when the distance between them becomes shorter than R. An exact alert can not be provided, as this would require an infinitely large number of location updates and distance computations to find the exact moment that the distance between the two users becomes R. To overcome this problem in defining the desired event, a distance tolerance is introduced into the task. An alert needs to be sent before the two users arrive at a distance R between them, but not earlier than a distance of R+$\epsilon$.

This model allows computation of the number of messages required to achieve any desired alert accuracy. It is further assumed that messages are transferred with no delay. This is analogous to the assumption $v*t_{delay} < \epsilon$, for v representing the velocity. Consequently, a distance tolerance at the time of receiving the alert, R−$\epsilon$, can naturally incorporate such practically small delays. The system and method provided hereby are general and do not depend on a specific definition of the task.

The choice of algorithm for maintaining social networks is an important issue. The number of messages would depend not only on the number of users, n, the distances between them, the vicinity radius R and the desired tolerance $\epsilon$, but also on the nature of their motion trajectories and relations between them. In the computational geometry literature, the kinetic model is a common paradigm for evaluating the efficiency of algorithms for maintaining dynamic structures.

In this paradigm, the role of the evaluated algorithm is to maintain some geometric properties for set of moving elements, where each element moves along a low-degree algebraic curve. From time to time, an event occurs, in which new elements are inserted, and existing elements are deleted or change their trajectories. The number of changes in the data structure is evaluated as a function of the number of events in the dynamic input data set.

Algorithms for tracking moving objects are found in mobile computing literature, both in the database community, and in the mobile communications community. Much of the work assumes that moving objects are represented by simple point objects whose locations are continuously updated in an index. These moving objects, however, require continuous updating of the locations of all users, resulting in huge numbers of location update messages. Trajectory-based solutions are becoming increasingly popular.

Storing and indexing trajectories facilitates not only efficient spatial range queries but time-and-space range queries. Time-parameterized bounding rectangles and extends trajectory information with expiration information have also been addressed.

The problem of computing and maintaining mobile social networks is also related to the problem of finding people whose personal profiles match. For this problem, commercial solutions have been offered. However, the problems addressed in involving networks of mobile friends, present new challenges that have not been addressed before. Due to the enormous number of existing mobile phone users worldwide, it would require a huge number of messages to be replaced for repeatedly checking the location of each pair of friends in such a large population, which process would also be quite inefficient. Adequate algorithms are required to address these new problems.

What is needed is a system and an associated method for minimizing the number of location update messages between pairs of friends in addition to an efficient method for computation and data collection. The need for such system and method has heretofore remained unsatisfied.

SUMMARY OF THE INVENTION

The present invention satisfies this need, and presents a system, a computer program product, and an associated method (collectively referred to herein as "the system" or "the present system") for detecting proximity between mobile device users.

The present system uses the term vicinity to refer to a circle of a pre-specified radius that can be uniform for all users or defined for each pair of friends. The algorithm for the peer-to-peer model can naturally accommodate a different vicinity radius for each pair of friends. Other definitions of vicinity, and even dynamically changing definitions, are possible. For example, the radius might change during daytime and nighttime, it might depend on the location, and it might be non-isotropic (e.g. in Manhattan, N.Y.). Vicinity includes a region of an arbitrary shape, such as a polygon, a convex polygon, or other shape.

Each mobile device knows its own location information, and the user would like to initiate a contact with other mobile devices based on their relative locations. In particular, the present system determines when pairs of pre-specified "friends" are getting closer then a distance R of each other and may automatically alert, or notify them whenever such an even occurs. A natural scenario for this case is of people carrying cellular phones who want to be aware of other people, such as business colleagues, customers, family and friends. As used herein, the term "alert" is used in connection with users; and the terms "message" and "alert message" are used in connection with the users' devices.

The present system uses a distributed algorithm referred to herein as the Strips Algorithm, in which two moving friends make an agreement about a buffering region between them. After the agreement is made, they do not need to follow each other's location until one of them enters the buffering region (or zone) for the first time. By doing so, they invalidate the agreement. Consequently, they replace a location update message between them, determine if they got within the R-vicinity of each other, and otherwise make a new agreement on a new buffering region.

In one preferred embodiment, these regions are bisection strips. This selection of this type of region maximizes the expected time to the next message if the user's direction and velocities are unknown. However, other shapes of regions may apply, especially if more information is provided. The region may be static or dynamic, but is independent of the changing location of the friends after it was defined and agreed upon. Its shape should ensure that as long as they stay out of this buffering region, the distance between them is larger than R. Therefore, each of the two friends can detect the event of it entering the buffering region without a need to know where the other friend is.

The distributed strips algorithm reduces the communication complexity, or the required "air time". The number of location update messages is logarithmic with the distance between the users when they start to approach each other from far away. It is also logarithmic with $1/\epsilon$ when they are getting closer, where $\epsilon$ is the desired tolerance for producing the meeting alert. Consequently, the Strips Algorithm provides a very efficient approach for the present system. In addition, the Strips Algorithm is superior to other algorithms such as the quadtree-based centralized algorithm.

In cellular networks (e.g. mobile phone networks), the present system could take advantage of the natural regions structure imposed by the cells of the network. As an illustration, if R is approximately the radius of a cell, then a user needs to keep track of friends registered to the user's own cell and neighboring regions. However, in general this solution might be unsatisfactory because the cell sizes vary greatly, ranging from large macrocells in rural areas to tiny picocells in metropolitan areas and buildings. Different users might define different vicinity radii with different friends. These vicinity radii can even change when the user moves from one place to another. For example, the user may not want to be alerted in his office for many of his friends being in a very close neighborhood, unlike when he or she is on an overseas trip.

In addition, not all wireless communication is based on cellular networks. In this case, a large group of users may form a clique of friends. Each one in the group has only to know the vicinity of his neighbors, knowing that others cannot get closer to him/her without passing first in the vicinity of one or more of them.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIGS. 12A and 13B represent the example of FIGS. 11A and 11B, after that user has moved.

DETAILED DESCRIPTION OF PREFERRED EMBODIMENTS

Figure 1:
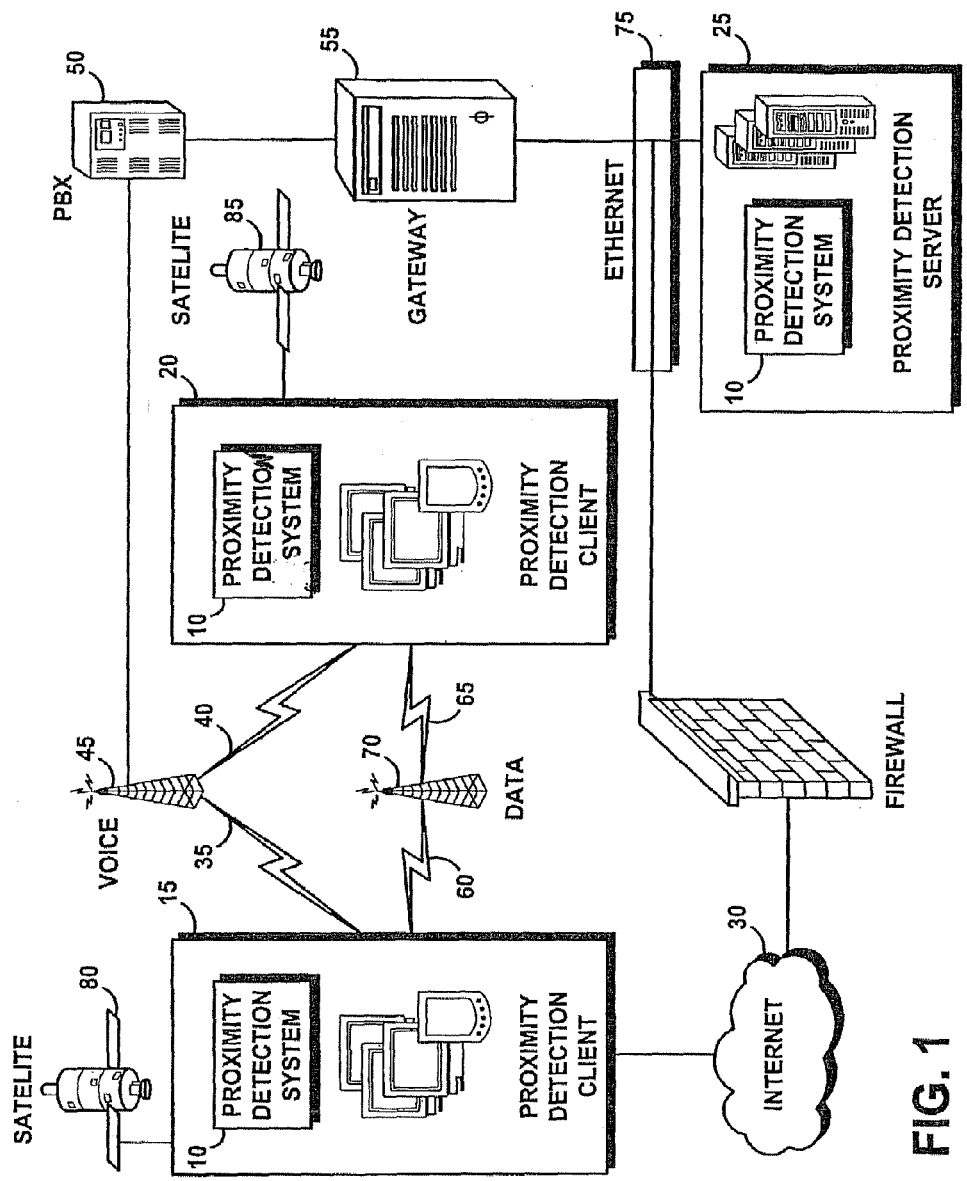
FIG. 1 is a schematic illustration of an exemplary operating environment in which a system for detecting proximity between mobile users can be used according to the present invention.

FIG. 1 portrays an exemplary overall environment in which a system 10 and associated methods for detecting proximity between mobile device users according to the present invention may be used. System 10 includes a software programming code or computer program product that is typically embedded within, or installed on a PDA or other wireless handheld device, cell phones, etc. as represented by proximity detection clients 15, 20. The function performed by system 10 can also be implemented in a server-side system such as proximity detection server 25. Alternatively, system 10 can be saved on a suitable storage medium such as a diskette, a CD, a hard drive, or like devices.

The proximity detection client 15, 20 communicates with other computers or networks of computers through various paths: the Internet 30; wireless communication as represented by voice transmission 35, 40 through antenna 45, PBX 50, and gateway 55; or data transmission 60, 65 through antenna 70 and the Internet 30 or Ethernet 75. Proximity detection client 15, 20 can be physically located by satellite 80, 85 using global positioning or triangulation using antennas 45 and 70.

System 10 assumes that each user carries a wireless device that includes a proximity detection client 15, 20, which, in turn, knows its own location and has sufficient computational power for a local computation. Although the user knows his/her own location at any time, he/she needs to acquire the current friend's location in order to compute his/her distance from that friend. Computing the current friend's location requires receiving a location update message from the friend to from a third party, such as a server, which maintains this information. It is an objective of system 10 to minimize the communication complexity, i.e., the number of location update messages exchanged with other mobile devices.

Figure 2:
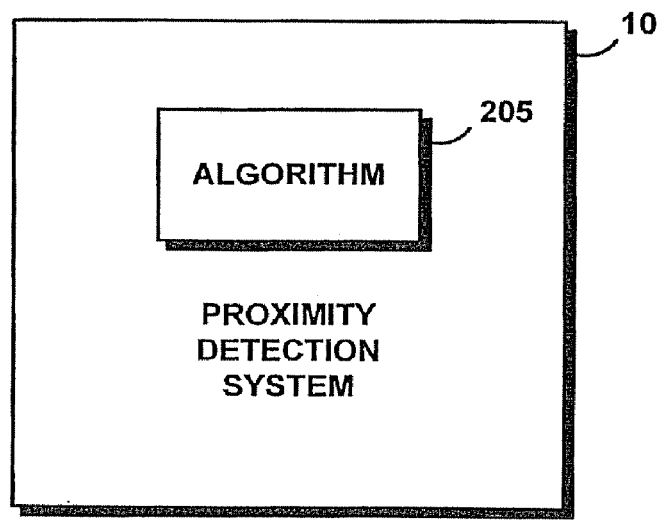
FIG. 2 is a block diagram illustrating a high-level architecture of the proximity detection system of FIG. 1.
Figure 3A:
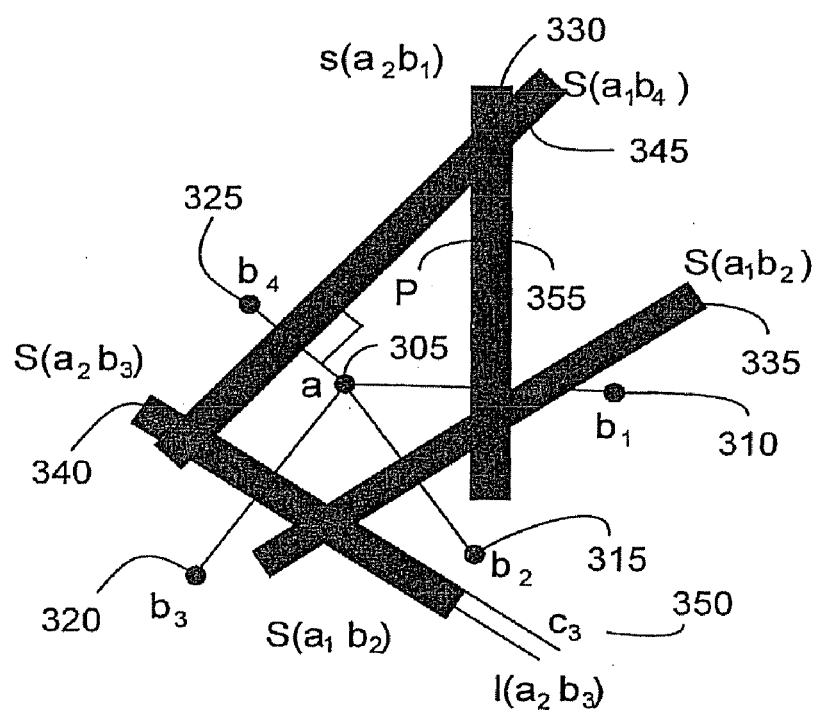
FIGS. 3A and 3B are diagrams illustrating the use of a Strips Algorithm of the proximity detection system of FIGS. 1 and 2.

With reference to FIG. 2, the proximity detection system 10 comprises an algorithm 205, such as the Strips Algorithm 205 disclosed herein. FIG. 3A illustrates the use of the algorithm 205 with relation to user a, 305, and several friends such as $b_1$, 310, $b_2$, 315, $b_3$, 320, and $b_4$, 325.

A typical embodiment is used to explain the algorithm. In this embodiment, a proximity alert is to generated for each pair of friends which arrive at a distance, or proximity, of R or less from each other. In this description, the same R notation is used for all pairs of friends, although R could be different for each pair of friends. Let a,b be two users who are friends and whose Euclidean distance, denoted ∥b−a∥, is larger than R, the desired distance for generating a proximity alert. Let l(a, b) denote the bisector of the line connecting a, 305 and b; i.e., the line comprising all points of equal distance from a, 305 and b. Let S(a, b) denote the infinite strip of width R whose axis is l(a, b). The strip for a, 305 and $b_1$, 310 is represented by S, 330.

The strip for a, 305 and $b_2$, 315 is represented by S, 335. The strip for a, 305 and $b_3$, 320 is represented by S, 340. The strip for a, 305 and $b_4$, 325 is represented by S, 345. Let $e_i$ denote the line bounding S(a, $b_i$) on the side closer to a, 305. The line bounding S, 340 for a, 305 and $b_3$, 320 is represented by $e_3$ 350. While a, 305 might move continuously, the strip S(a, b) is not being updated unless a specific event occurs that requires this update. Consequently, the strip update is a discrete event in time.

When a new user a, 305 is added to the system, the user's device communicates with each of its friends $\{b_1 \ldots b_n\}$, (or with a server), queries their locations, and announces its own location to the friends (and/or to the server). For each $b_i$, if ∥a−$b_i$∥>R, then a, 305 inserts into its data structure, D(a), the strip S(a, $b_i$). The strip S(a, $b_i$) divides the planes into 3 regions, namely the strip S(a, $b_i$) itself, the region containing a, 305, which is denoted $S^+$(a, $b_i$), and the region containing $b_i$, denoted $S^-$(a, $b_i$).

As long as neither a, 305 or $b_i$ enters S(a, $b_i$), they do not need to exchange location update messages. The strip serves as a static buffering region (or buffer zone) between a, 305 and $b_i$, and ensures that as long as they are on both sides neither one of them is in the vicinity of the other. This buffering region can be of different shapes and forms. Its desired properties are to have a Hausdorff distance that is greater than R between its two borders, in order to provide maximum motion to each user on its side of the strip, and to postpone as much as possible the event of a, 305 or $b_i$ intersecting with it. Since it is static, there is no need to exchange location or any other messages before such an event occurs.

The strip algorithm 205 demonstrates a peer-to-peer paradigm, where a, 305 and $b_i$ establish an agreement for region $S^+$(a; $b_i$), that as long as they keep the agreement there is no need to exchange further messages. Once a 305 (or $b_i$) penetrates region S(a, $b_i$), it communicates $b_i$ (or a, 305), sends him/her a location update message, and receives a location update message from $b_i$ (or a 305). All other $b_j$ with j≠i, remain intact and exchange no messages with a, 305.

Next, a, 305 and $b_i$ both determine whether the distance between them is greater than, or equal to R+ϵ, where ϵ is a fixed positive distance If so, a meeting alert message is invoked regarding their mutual vicinity. If the distance between them is still larger than R+ϵ, they compute a new strip, S(a, $b_i$), using their current new locations, and update S(a, $b_i$) in their data structures. The algorithm 205 can be summarized as follows in pseudo code:

```
SelfMotion( ) {
    do // repeat while moving
        a=ReadSelfLocation( )
        Test(D(a))
        for all i
            if ( a crossed $e_i$, or
            MsgReceived($b_i$))
                StripUpdate($b_i$)
        enddo
}
StripUpdate($b_i$) f
    send a's location to $b_i$.
    receive $b_i$'s location.
    if ∥a − $b_i$ ∥ < R + ϵ
        MeetingAlert("$b_i$ is nearby")
        Delete(D(a),S(a; $b_i$))
    else
        Compute S(a; $b_i$)
        Update(D(a),S(a; $b_i$))
    end
}
```

The data structure D(a) for the algorithm 205 is defined as follows. Let $$P = \cap_i S^+(a, b_i)$$

denote the region which contains a, 305 in FIG. 3A. As long as a, 305 stays inside P, 355, and $b_i$ does not enter region $S_i$, there is no need to exchange messages. P, such as P, 355, is a convex polygon of a degree not larger than n whose edges are a subset of segments of $\{e_i\}_1^n$, where n is the number of friends of a.

System 10 efficiently finds whether a, 305 exits P, 355 through any of the edges, for example $e_i$. Moreover, once a, 305 exits through the edge $e_i$, (i.e., requiring computation of a new $S(a, b_i)$) system 10 updates $S(a, b_i)$ in $D(a)$ in time $O(\log^2 n)$. Again, n is the number of friends of a.

The data structure may be based on the standard dual transformation. It transforms a point p=(a, b) in the primal plane to the line p*=ax+b in the dual plane, and the line l: y=mx+n in the primal plane to the point l*=(m;−n) in the dual plane. We divide the set of lines $\{e_i\}_1^n$ into two sets: U, the lines above a, and D, the lines below a. Lines which are vertical are treated separately.

Let U* and D* denote the sets of points in the dual plane which are the dual of U and D, respectively. If a happens to cross line $e_i$ that belongs to U, while still in the closure of P, then the corresponding line a* would intersect the point $e_i^*$, which must be a vertex of the convex hull of U*. In this case, $S(a, b_i)$ is deleted from $D(a)$, and a new strip $S'(a, b_i)$ is inserted. This corresponds to deleting the vertex $e_i^*$ from the convex hull of U*, and inserting the point $e'_i{}^*$, where $e'_i$ is the line bounding $S(a, b_i)$ on the side closer to a, 305.

Consequently, system 10 needs to maintain the convex hulls U*, D* in a dynamic manner such that their intersection with a query line can be accomplished efficiently. In addition, system 10 must also efficiently delete and insert points from and to the convex hulls. System 10 handles updates in (amortized time) $O(\log^{1+\delta} n)$ time and queries are performed in $O(\log n)$ time, wherein δ is an arbitrary fixed small positive constant.

Once two users enter the vicinity of each other, system 10 detects when they leave the vicinity, returning system 10 to its original state. When two friends are found to be a distance less then R from each other, a circle is created of radius R/2+2*ϵ centered at the midpoint of the line connecting the two friends. This circle is treated much the same way as a strip in that while both users remain within the circle, it is guaranteed that they are within a distance of less than R+4*$\epsilon_2$ from each other.

When one of the users leaves the circle, a location update message is exchanged between the friends. If the friends are still within a distance smaller than R+2*ϵ from each other, a new circle is computed. Otherwise, a state change occurs, the friends are again apart, and a new strip is computed. System 10 requires that two users move a total distance of at least 2ϵ between any two meeting alerts they exchange because of the requirement of being at most R+ϵ apart when a meeting alert is invoked, and being at least R+2ϵ apart when they get separated. This ensures that the algorithm state will not change back and forth in infinitely small time periods.

In an alternate embodiment, messages could be replaced at fixed time intervals, or at other times. Since the two users are within close vicinity, they may implement direct communication between them. It is natural to assume that if two friends have been notified of their proximity to each other they will meet if they choose to do so, without need for further messages. Hence the bounding circle could be made of a radius much larger than R+2*ϵ without diminishing the usability of system 10.

In yet another embodiment, the strip S(a,b) may be set in places other than around the bisector of the line connecting the user a with the user b. One such example is provided in FIGS. 3B and 4B, that illustrate the use of vertical and horizontal strips. The original strip around the bisection of the line connecting user a with user b is replaced with a dashed strip, which is either horizontal or vertical. The strip is set to be horizontal if the vertical component of the vector connecting between a and b is larger than its horizontal component. Similarly, the strip is set to be vertical if the vertical component of the vector connecting between users a and b is smaller than, or equal to its horizontal component. Since user a and user b are on both sides of the strip, the algorithm operates as described earlier.

Figure 3B:
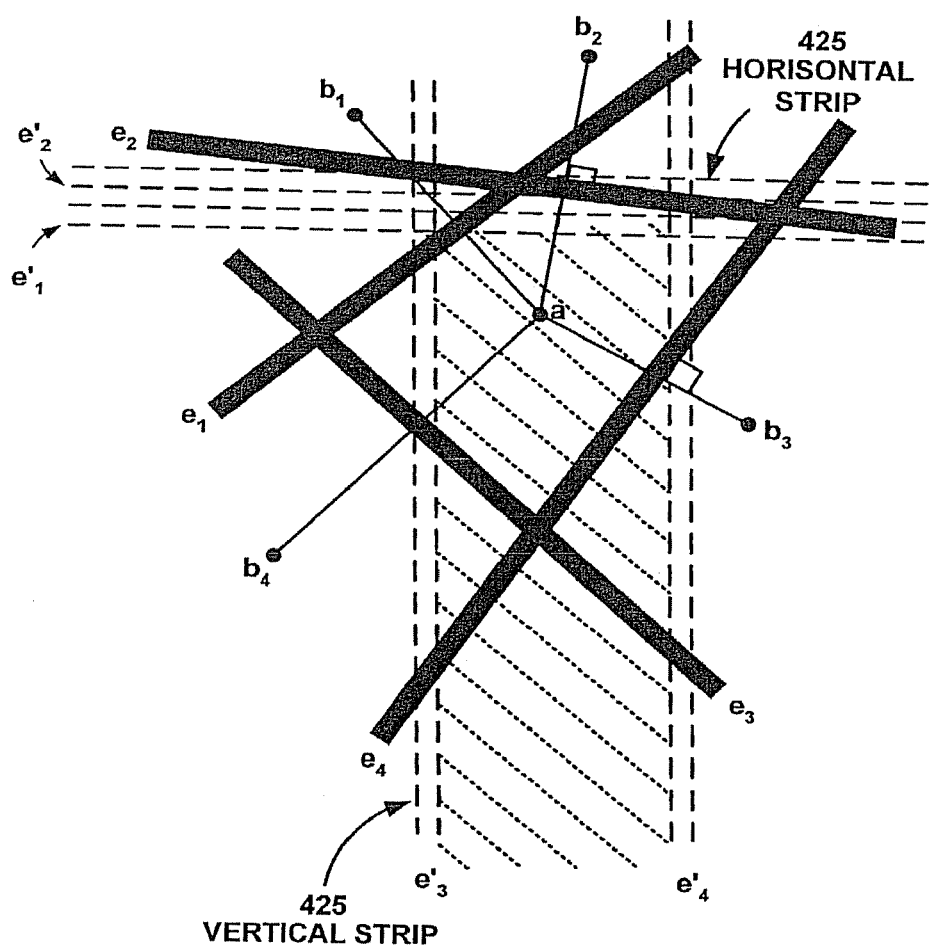

In FIG. 3, the user a needs to check its position with regard to a polygon of up to n edges. In FIG. 3B, the region P in which the user a can move without need for a location message is of the shape of an axis-parallel rectangle, defined by the dashed lines $e'_1$ $e'_3$ $e'_4$ (possibly with one or more edges at infinity). A rectangle region could be easier to maintain and test for point location. In an alternative embodiment, the strips could be set differently, but the strips algorithm remains applicable.

Figure 4A:
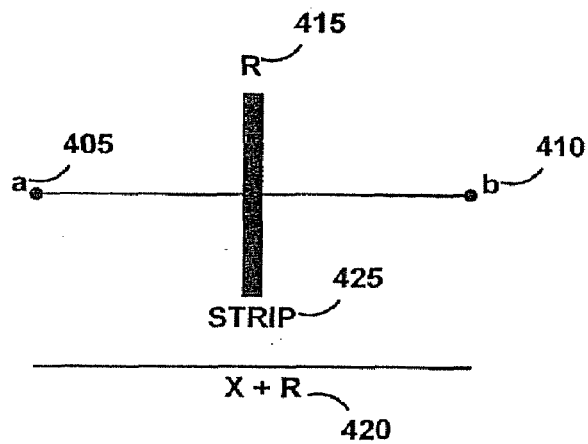
FIG. 4 comprises FIGS. 4A, 4B, and 4C, and represents diagrams illustrating the application of the Strips Algorithm of the proximity detection system of FIGS. 1 and 2 to a simple case of two users.
Figure 4B:
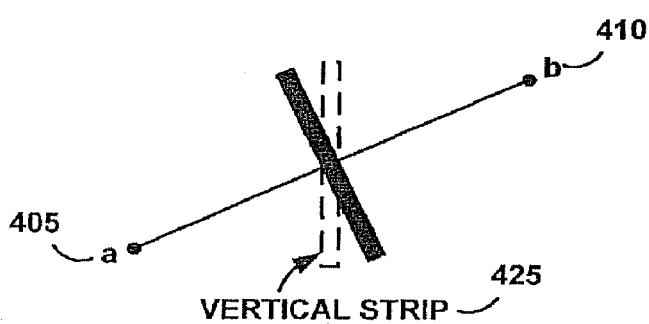
Figure 4C:
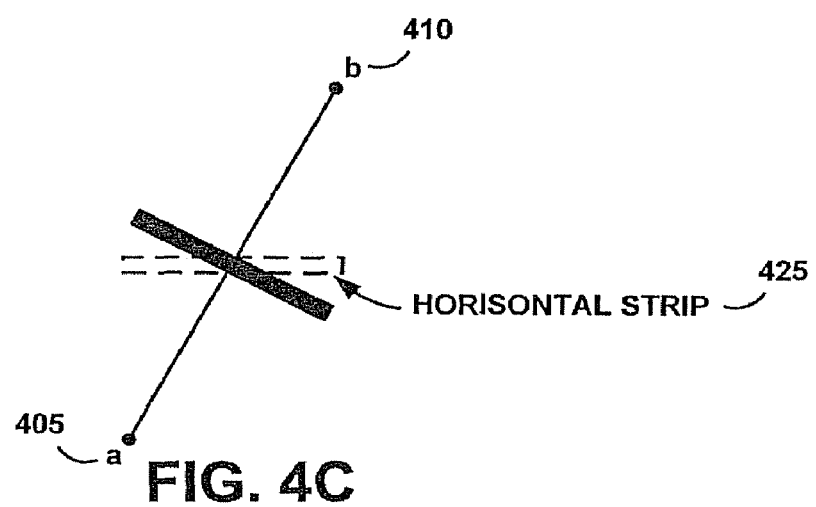

Analytic and numeric analysis of basic cases can be used to illustrate the efficiency of system 10. The role of ϵ in system 10 termination criteria (i.e., announcing a meeting alert) is illustrated by considering the simple case of two users a, 405 and b, 410 as shown in FIGS. 4A, 4B, and 4C.

Let user a, 405 be stationary, and let user b, 410 be moving on a straight line towards user a, 405. Denote the initial distance between a, 405 and b, 410 by [R+x], for some positive x, 420 and R, 415. The initial strip 425, S(a, b) is shown in FIG. 4A. When user b, 410 hits the strip, his/her distance from user a, 405 is half the initial distance x such as x, 420 plus half the width of the strip, R, 415. In general:

$$\frac{x+R}{2} + \frac{R}{2} = \frac{x}{2} + R.$$

Similarly, the next strip will be located such that b, 410 will hit its boundary at a distance from user a, 405. In general:

$$\frac{\frac{x}{2}+R}{2} + \frac{R}{2} = \frac{x}{4} + R.$$

This chain of strip-update events forms a series of distances which is the sum of one constant component, R, and a geometric series, $$\frac{x}{2^k},$$

for k=1, 2, 3, . . . . The termination condition for this series of strip-update events is when $$R + \frac{x}{2^k} < R + \varepsilon,$$

or just $$\frac{x}{2^k} < \varepsilon.$$

Consequently, the number k of strip-update events performed by a stationary user a, 405 and a user b, 410 moving on a straight line towards a, 405 from a distance (x+R) is given in general by:

$$k = \left\lceil \log_2 \frac{x}{\varepsilon} \right\rceil + 1.$$

Consequently, the number of messages replaced by user a, 405 and user b, 410 is logarithmic with the initial distance between them, and is also logarithmic with the term one over the desired tolerance, $\varepsilon$. This reflects the tradeoff between the desired accuracy and the required number of location update messages. It is a very small number of updates, demonstrating the efficiency of the algorithm. If one attempts to set $\varepsilon$ to zero, then in the limit k goes to infinity. That is, an alert at the exact time would require an infinitely large number of messages. Introducing a tolerance $\varepsilon>0$ into the model avoids this undesired case.

Figure 5:
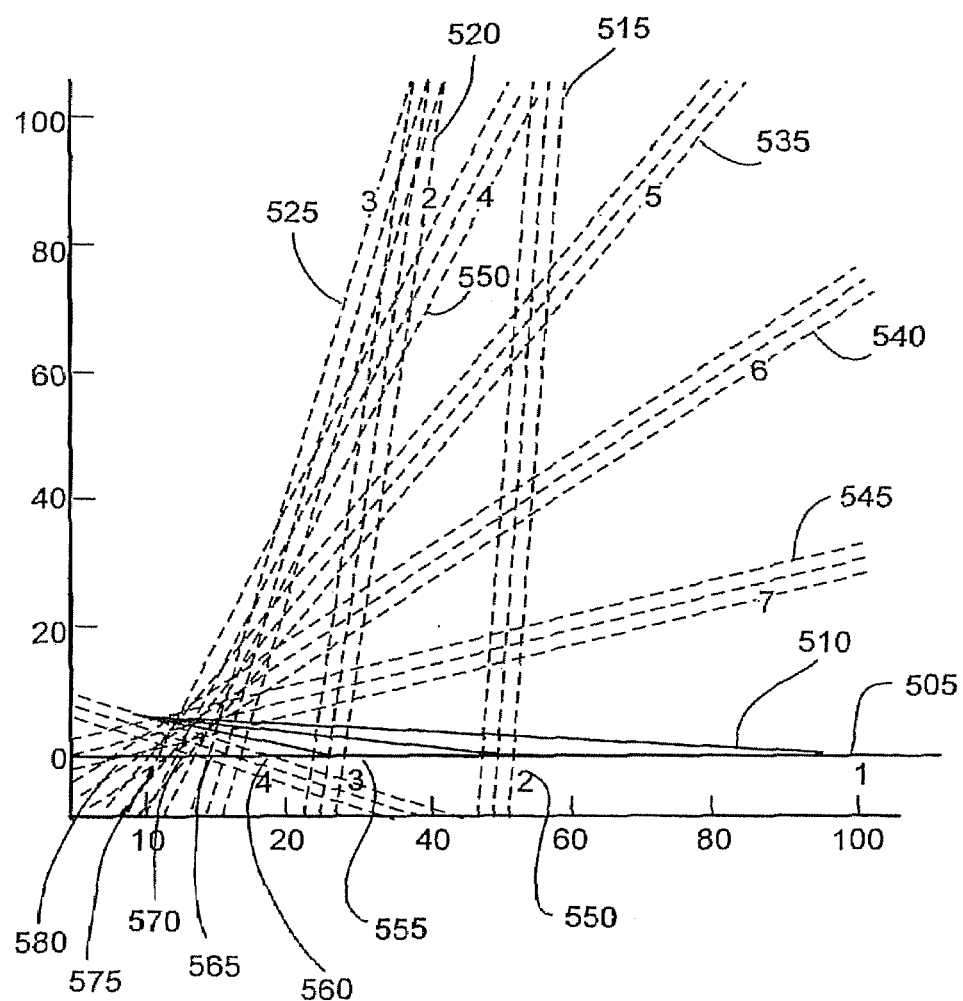
FIG. 5 is a diagram illustrating a typical sequence of updates by the Strips Algorithm of the proximity detection system of FIGS. 1 and 2.

A more general case is one in which b is moving on a straight line, but the stationary user a is located at distance d from the line. FIG. 5 shows a typical sequence of updates. The point b is moving from right to left on line 505, and its position at the times of hitting the strips is marked and labeled with the update number. The point b begins at position 510. The strips 515, 520, 525, 530, 535, 540, and 545 are shown in dashed lines. For instance, when user b hits strip 515, system 10 defines the location of point 550; when user b hits strips 520, 525, 530, 535, 540 and 545, system 10 defines the location of points 555, 560, 565, 570, 575, and 580, respectively. In this example, user b passes near user a but out of its vicinity and no meeting alert is produced. After the 8th update, corresponding to point 580 on strip 545, b would continue to move and no more updates will be performed.

In general, user b starts at point (x; 0). The intersection with the strip occurs at (x'; 0), where:

$$x' = \frac{x}{2} - \frac{d^2}{2x} + \frac{R}{2}\sqrt{1 + \frac{d^2}{x^2}}.$$

System 10 iterates this process until one of two termination cases occurs. The first termination case is as illustrated in FIG. 5, where no alert is produced. The second termination case occurs when d<R+$\varepsilon$; b enters the vicinity of a and a meeting alert is produced. The highest number of messages is required when b passes very close to a, but remains out of its R-vicinity. For long distances the number of messages is logarithmic with the distance, and for short distances the number of messages is logarithmic with 1/$\varepsilon$. This is a very efficient property of the algorithm 205 of system 10.

This behavior is further analyzed for the case of $\varepsilon$=R as shown in FIG. 6 (FIGS. 6A, 6B, 6C, and 6D). Let a, 605 and b, 610 be two users, with a, 605 staying at a fixed position and b, 610 moving in a straight, vertical trajectory towards point c, 615, FIG. 6A. Let d, 620 denote the horizontal distance of b, 610 from a, 605, and let v, 625 be the vertical distance of b, 610 from a, 605. Assume also for simplicity that users exchange location update messages when they hit the center of the strip 630.

In general, the upper bound for the number of update messages sent is:

$$\leq \log_2\left(\frac{v}{R}\right) + 1 \text{ if } d < \sqrt{3}\,R, \text{ and is}$$

$$\leq \log_2\left(\frac{v}{d}\right) + 1 \text{ if } d \geq \sqrt{3}\,R.$$

Figure 6A:
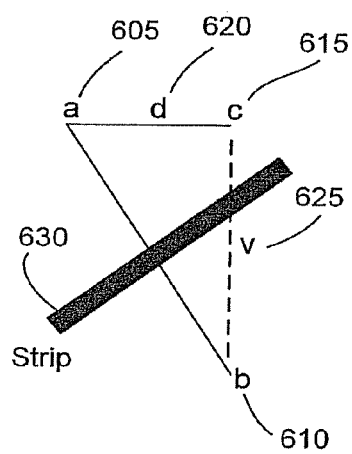
FIG. 6 is comprised of FIGS. 6A, 6B, 6C, and 6D, and illustrates the behavior of the Strips Algorithm of the proximity detection system of FIGS. 1 and 2.
Figure 6B:
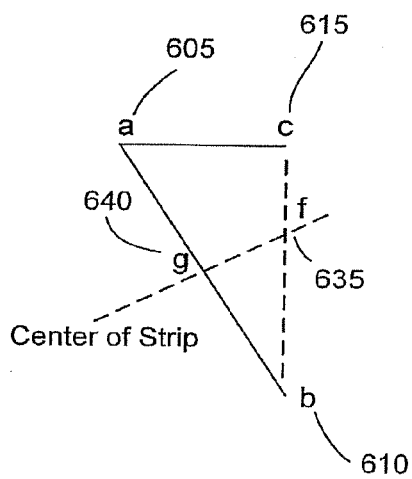

In FIG. 6B, user b, 610 is moving in a vertical direction. The first strip update occurs when b, 610 reaches the center of strip 630 (point f, 635). The triangle formed of f, 635; g, 640; and b, 610 is right angled since the angle formed of f, 635; g, 640; and b, 610 is also right angled. Since the triangle f, 635; g, 640; and b, 610, and the triangle formed of a, 605; b, 610; and c, 615 are right angled and share the angle formed with a, 605; b, 610; and c, 615, they are similar triangles. Hence:

|g (640) b (610)|/|b (610) c (615)|=|f (635) b (610)|/|a (605) b (610)|.

For the middle of the strip,

|g (640) b (610)|=|a (605) b (610)|/2.

Therefore:

|f (635) b (610)|=|a (605) b (610)|*|g (640) b (610)|/|b (610) c (615)|, or

|f (635) b (610)|=|a (605) b (610)|*|a (605) b (610)|/(2*|b (610) c (615)|).

Since: |b (610) c (615)|≦|a (605) b (610)|, it is deduced that:

|f (635) b (610)|≧|b (610) c (615)|*|b (610) c (615)|/(2*|b (610) c (615)|), or

|f (635) b (610)|≧|b (610) c (615)|/2.

Every time user b, 610 hits the strip, the vertical distance is reduced by at least half. This recalculation continues until the vertical distance reduces to 2R, at which point the users exchange an alert message. The maximum horizontal distance is now $\sqrt{3}R$, the vertical distance is R and so the Euclidean distance between users is greater than or equal to 2R. Therefore, the maximum number of times a location update message is sent is •$\log_2$(v 625/R)+1.

Figure 6C:
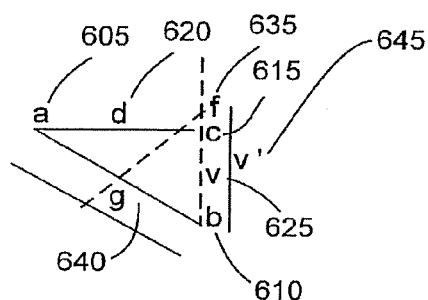
Figure 6D:
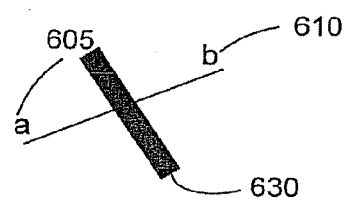

In the case where d, 620 is greater than $\sqrt{3}R$, the users might or might not exchange alert messages. If the horizontal distance d, 620 is ≧2R, the users never exchange alert messages. In any case, the maximum possible number of update messages is finite because once user b, 610 moves above user a, 605, the slope of the strip would change in sign (as shown in FIG. 6D), and user b, 610 would never hit the strip with his current trajectory.

The point at which the sign of the slope of the strip changes determines the maximum possible number of update messages. This change in slope sign takes place in a situation illustrated in FIG. 6C. When user b, 610 reaches point f, 635, the slope of the strip changes in sign.

The point at which the intersection of the strip with the trajectory of user b, 610 is above user a, 605 is determined as follows. Let v', 645 denote the distance between user b, 610 and the point at which user b, 610 reaches the center of the strip (the length of the segment |b (610) f (635)| in FIG. 6C). Let x=|a (605) b (610)|, as depicted in FIG. 6C. As above by similarity of triangles (a, 605; b, 610; and c, 615)

and (f, 635; g, 640; and b, 610) are similar, |g (640) b (610)|/|c (615) b (610)|=|f (635) b (610)|/|a (605) b (610)|.

In general, by substituting the notations introduced above:

x=(2v)=v'=x. Therefore, $x^2$=2v v'. However, $x^2=v^2+d^2$, therefore $v^2+d^2$=2v v'. Thus $$v'=(v^2+d^2)/(2v).$$

Two possibilities could arise: v>d and v≦d.

First possibility: v>d. Here, $v'<(v^2+v^2)/(2v)$, so v'<v, and strip update continues.

Second possibility: v≦d. Here, $v'\geq(v^2+v^2)/(2v)$, or v'≧V. Consequently, the intersection point of the center of the strip with the trajectory of b 610 goes above user a 605. With each strip recalculation the vertical distance |v| reduces by at least half. In addition, the recalculation must be continued until the orientation of the strip changes its sign. Consequently, the recalculation occurs ≦$\log_2$(v/d)+1 times.

The behavior of algorithm 205 of system 10 is further analyzed under arbitrary motion of multiple users using the kinetic data structure (KDS) framework. In the kinetic data structure, the attribute being maintained is known as the configuration function (CF). For system 10, the configuration function is the set of friends of a user that are within a radius of R. The key insight to the approach is that an evolving proof of correctness of the configuration function is maintained. Such a proof will comprise of a number of elementary conditions on moving data called certificates. These certificates together imply the correctness of the value of the configuration function. For system 10, the certificates are the convex polygon surrounding each user.

The kinetic data structure is evaluated by the following four criteria: responsiveness, locality, compactness, and efficiency. The kinetic data structure is good if the cost of testing the certificates and processing certificate failure (if certificate fails) is small. This metric is known as responsiveness. As shown above, testing a certificate can be achieved in O(log n) time. Once a certificate fails, the cost reconstructing the certificates is O($\log^{1+\delta}$ n).

The locality of a kinetic data structure is the maximum number of certificates in which any one moving object can appear. For system 10, the locality is O(1) because a user can appear in only one convex polygon. The size, or compactness, of the kinetic data structure is the maximum number of certificates ever present in the proof. For system 10, one convex polygon is associated with each user. Consequently, the size of the kinetic data structure is O(n) and it is considered compact.

A key performance criterion of the kinetic data structure is the worst case number of events processed. The aim is to develop a kinetic data structure for which the total number of events processed in the worst case is asymptotically same order or slightly larger than the number of events that cause the failure of one of the certificates. For system 10, the certificates are tested at fixed intervals to determine if the user is inside the convex polygon. The fixed interval of time is chosen by assuming a suitable upper bound on the velocity of the users.

In the worst case, a user is inside a vehicle and moves at a very high speed. Every time the certificate is checked under these conditions, it is possible for the user to have hit the edges of the convex polygon. Consequently, our data structure is efficient. However, it is only weakly efficient. Strong efficiency means that worst case ratio of total events processed to external events is small. In terms of strong efficiency, system 10 might be theoretically zero efficient because it is possible for the user to move inside the convex polygon arbitrarily without hitting the edges of the convex polygon. However, to date only few strongly efficient kinetic data structures have been found and those were found under highly restrictive motion assumptions.

Figure 7:
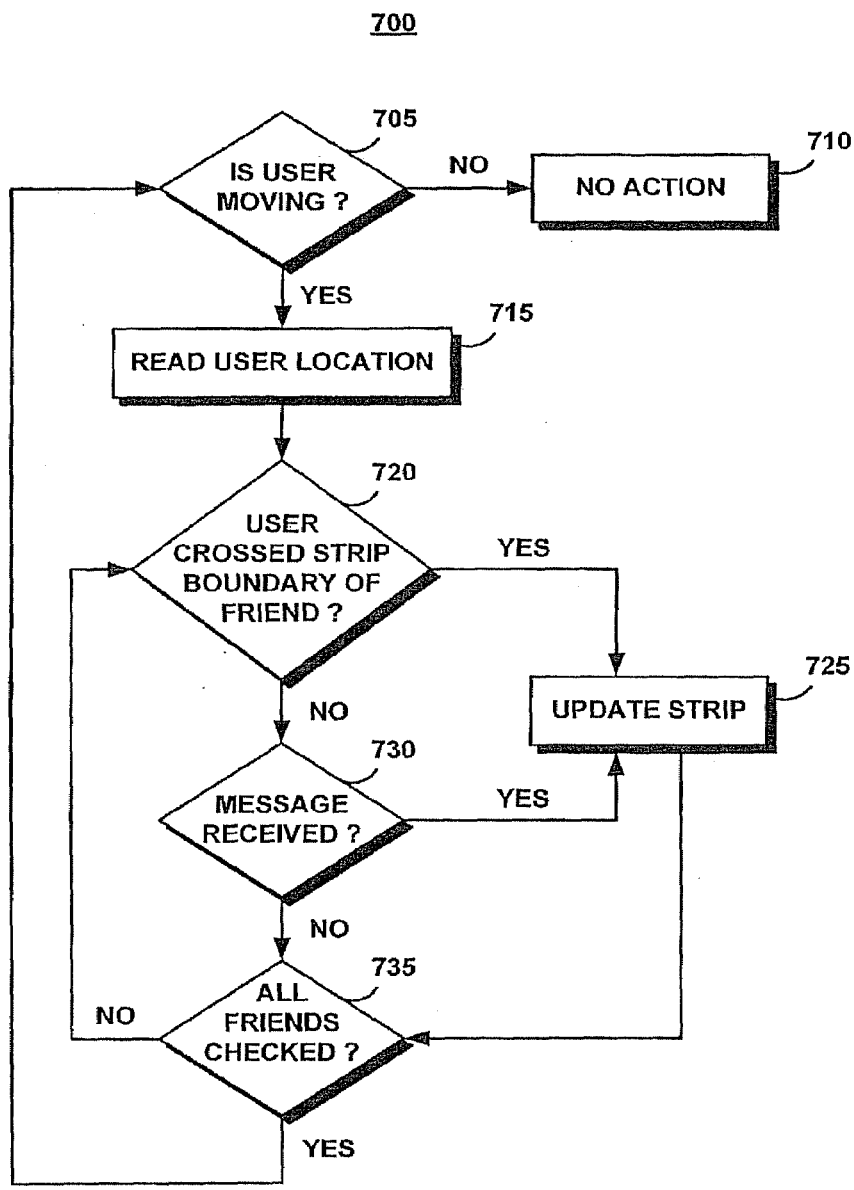
FIG. 7 is a process flow chart illustrating a method of operation of the proximity detection system of FIGS. 1 and 2.

FIG. 7 illustrates a method 700 of operation of system 10. At block 705, system 10 determines whether the user is moving. If not, no action is taken (block 710). If the user is moving, system 10 reads the user's location at block 715.

System 10 then determines whether the user has crossed the boundary of the first friend (decision block 720). If the user has crossed a boundary, system 10 updates the strip defining the buffer between the user and his friend at block 725. If at decision block 720 the user has not crossed the boundary of the first friend, system 10 determines whether a message has been received from the friend at decision block 730. If a message is received from the friend, the user knows where the friend is and has no need to check for his/her location.

Consequently, system 10 updates the strip at block 725. If no message has been received from the first friend (decision block 730), system 10 determines whether there are additional friends whose position must be updated at decision block 735. If additional friends remain, system 10 repeats steps 720 through 735 until all friends have been checked. System 10 then returns to decision block 705, repeating steps 705 through 735 as long as the user is moving.

Figure 8:
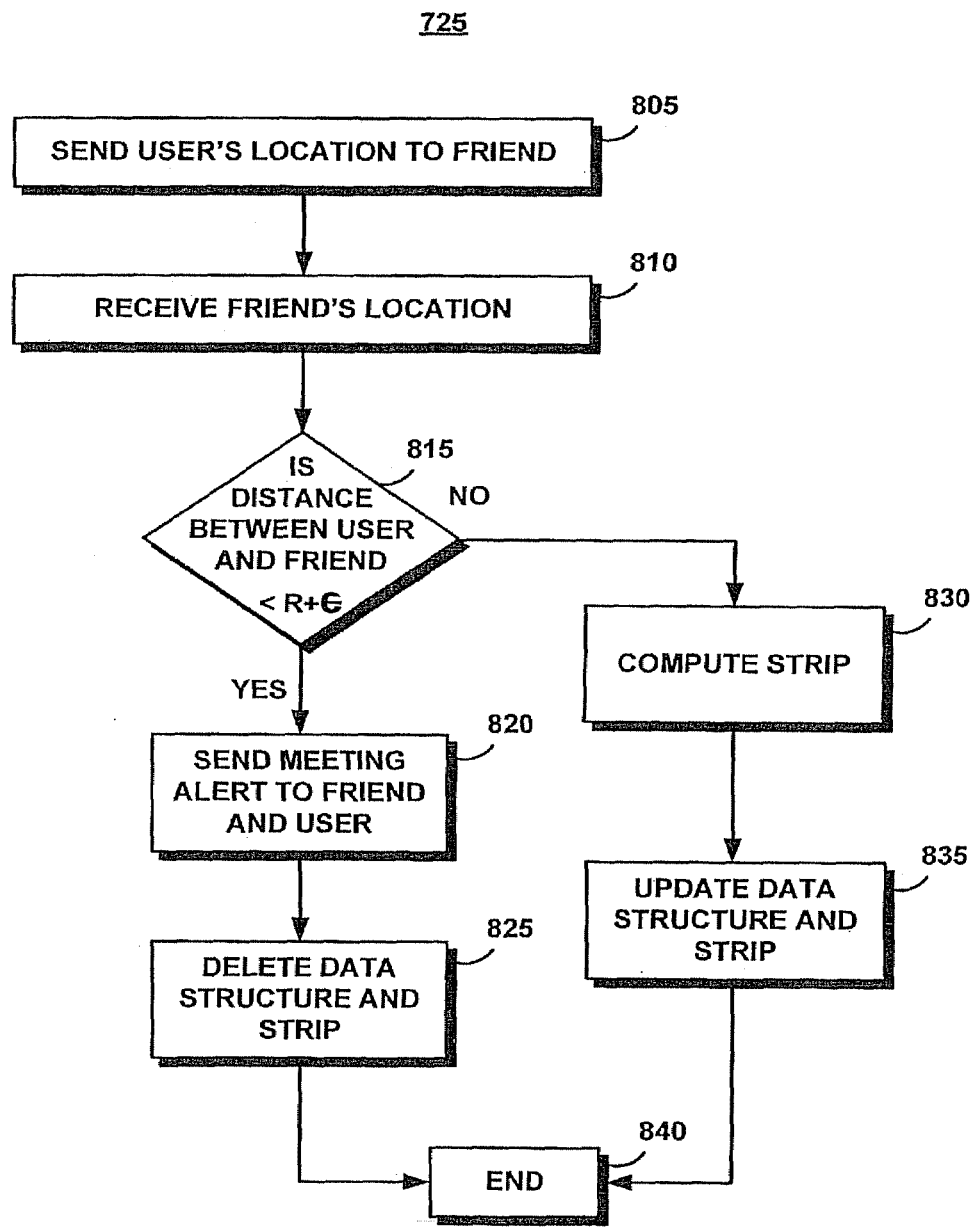
FIG. 8 is a process flow chart illustrating a method of operation of the update strip function of the proximity detection system of FIGS. 1 and 2.

The method 725 of the update strip portion (block 735) of system 10 is described in more detail in FIG. 8. At block 805, system 10 sends the user's location to a friend. At block 810, system 10 receives the friend's location.

System 10 then determines if the distance between the user and the friend is less than the radius of the user's pre-determined cell, R, plus a small value, ϵ, arbitrarily chosen to minimize the number of updates that occur when the distance between the user and the friend reaches R. If the distance criteria is met at decision block 815, system 10 sends a meeting alert to the friend and to the user notifying both that they are in each other's vicinity (block 820).

System 10 then deletes the data structure and strip pertaining to that one friend at block 825 since they now know each other's location. System 10 then ends the update strip portion of the method 700 of system 10. If the distance between the user and the friend do not meet the distance criteria of decision block 815, system 10 computes the strip at block 830 and updates the data structure and the strip at block 835. System 10 then ends the update portion of the method 700 of system 10.

The algorithm 205 of system 10, which works in a peer-to-peer distributed fashion, is very efficient even if implemented on a central computational facility. It eliminates the need to re-compute the distances between user a and all of his friends every time that user a updates its location information on the server. This algorithm further allows the radius of vicinity to be different from user to user in addition to a different and an asymmetric vicinity definition between any pairs of users. Another embodiment of system 10 is based on a quadtree representation. The quadtree is a regular structure that is commonly used in GIS. This version of algorithm 205 is useful if the radius of vicinity is the same between all pairs of users and the user is willing to accept a rough level of approximation in the radius of vicinity. This approach is best suited for a distributed server system, i.e., one in which each cell of the cellular network, or a cluster of cells, is capable of performing some computation.

The following definitions and explanations provide background information pertaining to the technical field of the present invention, and are intended to facilitate the understanding of the present invention without limiting its scope:

A graph is composed of nodes and edges.

A path includes an ordered list of edges connecting between a sequence of nodes.

A circle includes an closed path, where the first and last nodes is the same node.

A tree is a graph. It is a special graph with no circles.

A root: One of the nodes in a tree is defined as the root of the tree. There is a unique path from the root to each node in the tree.

Father, child: The tree node b is called the father of node a, and a is called a child of node b, if b is the first node on the path from a to the root of the tree.

Brother: two tree nodes with the same father are called brothers.

Leaf: A tree node with no children is called a leaf.

Quadtree: A tree structure used to represent spatial information in an efficient manner. Quadtrees are often used in Geographic Information Systems (GIS). Each node in a quadtree is associated with a region, denoted as the node's region. The root of the quadtree is associated with a square region, representing the entire space. A node in the quadtree is either a leaf, or an internal node. An internal node has four children. Each child is associated with a square region which is one quadrant of its father's region. Hence the father's region is also the union of its four children's regions. Each node in the quadtree might contain additional information associated with its region, such as the list of the users located in that region, and other kinds of information.

A leaf-region: A region in space associated with a leaf in a tree. In particular, a quadtree leaf is a square region.

Neighboring leaf regions: Leaf regions sharing an edge.

A balanced quadtree: A quadtree in which the difference in size between two neighboring leaf regions is at most a factor of 2. Hence, any leaf region would have no more than a fixed number (8) of neighboring leaf regions.

A netted quadtree: A quadtree in which each a leaf contains a list of all the leaves associated with the regions neighboring it. In a balanced quadtree the length of this list is bounded.

A user includes a person carrying a mobile device. In a broader sense, the mobile device need not be carried by a person, but could be attached to a car, a package, an object, etc.

Friend: A pair wise relation between mobile devices associated with each other in some way, for which location proximity alert is desired, is referred to herein as "friendship". Mobile devices associated with device a are referred to as the friends of a. While taking the analogy from people and their friends, colleagues, family and other social relations, this definition applies in a broader sense to devices either carried by people or otherwise attached to cars, moving parcels and so on, when they are associated with each other.

Gateway: A device that connects two computer networks that use different protocols. It translates between protocols so that computers on the connected networks can exchange data. For example, commercial online services often have gateways for sending e-mail to Internet addresses.

GIS (Geographic Information System): A computer system that has maps and geographic information, and sometimes analyses of geographic data.

GPS: (Global Positioning System) A satellite-based radio navigation system run by the U.S. Department of Defense. Using 24 MEO satellites for identifying earth locations, the first GPS satellite was launched in early 1978. By triangulation of signals from three of the satellites, a receiving unit can pinpoint its current location anywhere on earth to within 20 meters horizontally.

Hash bucket or Hash cell: A hash bucket or cell is a single bucker or cell in a hash table.

Hash Table: A lookup table designed to efficiently store non-contiguous keys (account numbers, ID numbers, etc.) that may have wide gaps in their alphabetic and numeric sequences. Hash tables are created by using a hashing function to hash the keys into hash buckets. Each bucket is a list of key value pairs. Since different keys may hash to the same bucket, the goal of hash table design is to distribute key-value pairs evenly with each bucket containing as few key-value pairs as possible. When an item is looked up, its key is hashed to find the appropriate bucket. Then, the bucket is searched for the right key-value pair.

Hausdorff distance: Named after Felix Hausdorff (1868-1942), Hausdorff distance is the "maximum distance of a set to the nearest point in the other set". More formally, Hausdorff distance from set A to set B is a maximum function, defined as $$h(A, B) = \max_{a \in A} \{\min_{b \in B} \{d(a, b)\}\}$$

Internet: A collection of interconnected public and private computer networks that are linked together with routers by a set of standards protocols to form a global, distributed network.

Kinetic Data Structure: Is an abstraction of dynamic data structures, used to evaluate their performance using several measuring criteria, four of which are mentioned bellow.

PBX (Private Branch Exchange): A telephone exchange used within an organization and located on the premises; an example would be the main switchboard in a hospital.

PDA: (Personal Digital Assistant) A handheld computer that serves as an organizer for personal information. It generally includes at least a name and address database, to-do list and note taker. PDAs are pen based and use a stylus to tap selections on menus and to enter printed characters. The unit may also include a small on-screen keyboard which is tapped with the pen. Data are synchronized between the PDA and desktop computer via cable or wireless transmission.

The alternate embodiment of system 10 assumes that the "friendship model" is symmetric; that is, user a is a friend of user b if, and only if user b is a friend of user a. This assumption is not critical and can be removed by maintaining for every user a two lists, namely the friends of a, and the lists of users that have a as a friend.

The algorithm 205 of the alternate embodiment of system 10 is guaranteed to send an meeting alert message if the distance between friends is approximately R. More precisely, it guarantees to send a message if the distance is $\leq R$, and not to send a message if the distance is $\geq 2\sqrt{2}R$. This is equivalent to selecting $\epsilon=(2\sqrt{2}-1)R$. As for the Strips Algorithm, whenever the distance between two friends is larger than R and smaller than R+$\epsilon$, there is no guarantee about sending or not sending a meeting alert.

The centralized scheme of the alternate embodiment of system 10 is designed for the case where either the wireless devices carried by users do not have much computational power or for other reasons the computation is performed at a central site such as proximity detection server 25. In particular, there might be cases where the proximity detection server 25 knows the location of all the users all the time and does not need to send special messages to ask them for location updates, as is assumed with the Strips Algorithm.

Let $\Gamma$ be a partition of the plane into regions, defined recursively as follows. Initially $\Gamma$ comprises a single square region, covering the entire region of operation. Let c be a region of $\gamma$. If R either contains one or more 1 users, or its edge-length is less than or equal to R, stop. Otherwise, replace c with four equal-size squares, $R_1$, $R_2$, $R_3$, and $R_4$, representing its four quadrants.

This division imposes a quadtree data structure T with the property that every leaf-region whose size is larger than R contains at most one user. A region containing more than a single user is a live region. Consequently, live regions are always of same edge size, less than or equal to R, and from here on their size is assumed exactly R. The quadtree data structure T is augmented so that it is a balanced and a netted quadtree. That is, the difference in size between two neighboring leaf regions is at most a factor of 2, and each leaf region maintains poi7nters to all of its neighboring regions.

For every user $b_i$ let $F(b_i)$ denote the list of friends of $b_i$. For every region $c \in \Gamma$ let U(c) denote the users currently inside c. The basic concept algorithm 205 of the alternate embodiment of system 10 is as follows. Once user $b_i$ registers with the system and reports its location, the system seeks friends of $b_i$ in the region $c \in \Gamma$ containing $b_i$ in addition to the neighboring regions of c. There are $\leq 8$ regions if c is a leaf; the number of neighboring regions can never exceed 12 since T is a balanced quad-tree. When $b_i$ moves from region c to a new region, c', system 10 needs only to check if any friend(s) of $b_i$ are found in any of the new neighboring regions.

System 10 initially finds the region c containing $b_i$. Let h denote the height of the quad-tree T. The size of all live regions containing two or more users is exactly R. The coordinates of the left lower corner of such regions is ($m_x R$, $m_y R$), where $m_x$, $m_y$ are integers. The pair ($m_x$, $m_y$) is the index of c. For every point p=(x, y), the index of the live leaf region containing p, if one exists, is given by ($\lfloor x/R \rfloor, \lfloor y/R \rfloor$).

Consequently, all the live regions are stored in a hash table where the key is the index of the live region. A pointer from the Hash bucket to the leaf of T is associated with this region. Hence, finding users within the same region as user p is performed in expected time O(1). Once this region is found, properties of the netted quadtree are used to find the neighbor regions by following the links to the neighbors in O(1) worst-case time.

System 10 next finds if there are any friends of $b_i$ in the vicinity of $b_i$. For each live region c, a hash table is maintained of all the users currently inside c. For every user $b_i$, a hash table is also maintained of its friends. When $b_i$ enters a new region c', the length of the friends list is compared with the length of the combined lists of occupants in the (up to four) neighboring regions to c' that are not neighbors of c. If the list of friends is shorter, the distance to every friend of b is checked. Otherwise, all occupants of the neighboring regions are checked to determine whether any of them are friends of $b_i$. Consequently, the running time is $O(\min\{|F(b_i)|,|U(c)|\})$ (in the expected sense, due to the use of hash tables).

Algorithm 205 can be improved to reduce the size of the list of friends that $b_i$ needs to check upon entering a region c. Let $q_1$, $q_2$ and $\pi(q_1, q_2)$ denote two nodes in T and the path in T from $q_1$ to $q_2$, respectively. Let p, $R_p$ denote a node in the tree and the region in the plane associated with it, respectively. Let $F_p(b_i)$ denote the friends of $b_i$ who are currently not in $R_p$ but are inside $R_{parent(p)}$ (i.e., they are in the other three quadrants of $R_{parent(p)}$ that are not $R_p$). In addition, $F(b_i)$ is defined as the friends of $b_i$ that are in the same leaf as $b_i$. If $b_i$ is in the leaf $R_q$, then the list of all friends of $b_i$ is given in $F(b_i) \cup U_{p \in \pi(root(T),q)} F_p(b_i)$. For consistency purposes, $F_{root(T)}$ is defined as the empty set. Intuitively, $F_q(b_i)$ is all the friends of $b_i$ who are in the same city as $b_i$ but are not in the neighborhood of $b_i$.

When a new user $b_i$ registers with the system (e.g., he turns on his cellular phone), the system 10 finds the leaf region $R_q$ containing $b_i$, checks the list $F(b_i)$ of friends of $b_i$, checks their location in T, and creates the lists $F_p(b_i)$. These tasks can be performed efficiently in expected time $O(h+|F(b_i)|)$, where h is the height of T.

A region-crossing event occurs when $b_i$ moves from one leaf-region $R_q$ to another leaf-region $R_q'$. If $R_q'$ already contains at least one user, system 10 might need to split $R_q'$, if its size is larger than R. Algorithm 205 traverses up the tree T from q until $\theta$ is reached. The node $\theta$ is the lowest node of T for which $R_\theta$ contains both $R_q$;$R_q'$ and all their neighboring leaf regions. All the friends of $b_i$ that occupant $R_q'$ or any of its neighboring leaf regions new to $b_i$ are found by checking for all friends that are stored in one of the lists $F_p(b_i)$, for $p \in \pi(q',\theta)$. Let L denote this list of friends (that is, $L=F(b_i) \cup U_{p \in \pi(\theta,q')} F_p(b_i)$) A meeting alert is sent to each such friend found.

Next, for each friend a that is checked, system 10 also needs to update his lists of friends, to inform them of the change in the location of $b_i$. For this, the alternate embodiment of system 10 deletes (resp. inserts) $b_i$ from (to) the lists $L_p$ for all $p \in \pi(\theta,q')$. These lists are then updated.

A few theoretical bounds are discussed below that support the claim that this data structure is indeed efficient. In algorithm 205, the number of updates could be $2^h$ times the number of friends of a, where h is the height of the quadtree. Let $\gamma$ be a curve in the plane, with the property that every straight line crosses $\gamma$ at K points at most, where K is a small constant. Let $b_i$ move along $\gamma$, and assume that all his friends are stationary. Then the total number of checks and updates performed by algorithm 205 is only $O(n_i h)$, where $n_i$ is the number of friends of $b_i$, and h is the height of T. This bound is tight in the worst case.

As proof, let a be a friend of $b_i$. Each time $b_i$ enters into a new leaf region, a new list L is created. Assume $b_i$ moves from $R_\mu$ into $R_\mu'$, for leaf nodes $\mu, \mu' \in T$, and accordingly a is in L. Only the number of times a appears in L needs to be bound. The friend of $b_i$, a, lies in exactly h regions $R_{\alpha 1}, \ldots R_{\alpha h}$ (where $\alpha i$ is a node of T). This follows since $\gamma$ crosses the boundary of $R_{\alpha i}$ (for every $1 \leq i \leq h$) at most 4K times.

The lower bound is reached in the following case. Let all the friends of $b_i$ be located in one small region of size R and let $b_i$ move on a straight line across this region and through the entire region covered by the quadtree. This causes the moving of all the n friends from the root level of the tree to the leaf level in h separate steps.

Figure 9:
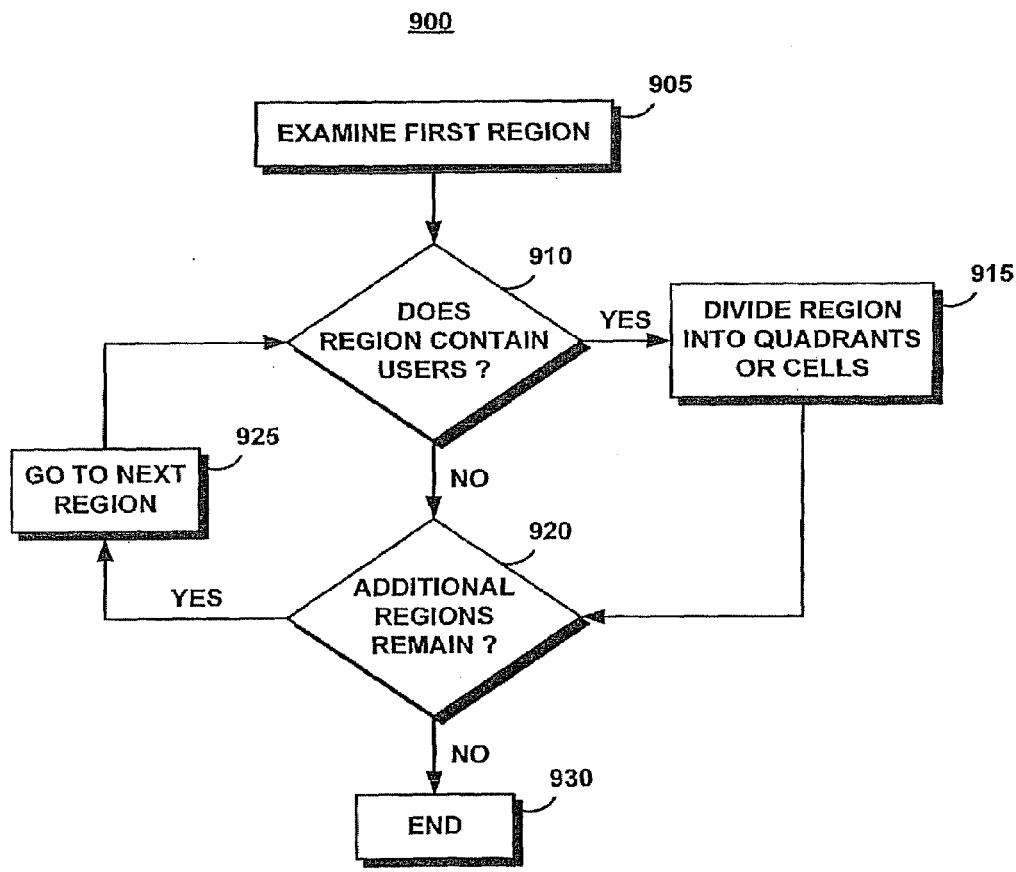
FIG. 9 is a process flow chart illustrating a method of operation of an alternate embodiment of the proximity detection system of FIGS. 1 and 2, in dividing regions into quadrants or regions.

FIG. 9 illustrates the method 900 of the alternate embodiment of system 10 in dividing regions into smaller regions for locating users and their friends. At block 905, system 10 examines the first region. If the region contains more than one user at decision block 910, system 10 divides the region into quadrants at block 915. System 10 then proceeds to decision block 920, as it would if no users had been found in the region, and checks for additional regions to divide. If additional regions remain, system 10 goes to the next region at block 925 and repeats blocks 910 through 925 until all blocks have been checked. This process ends at block 930.

Regions of edge size R or less are not divided into smaller regions. Those leaves could contain more than a single user. Note however, that all the friends among those users are already within the vicinity of each other.

Figure 10A:
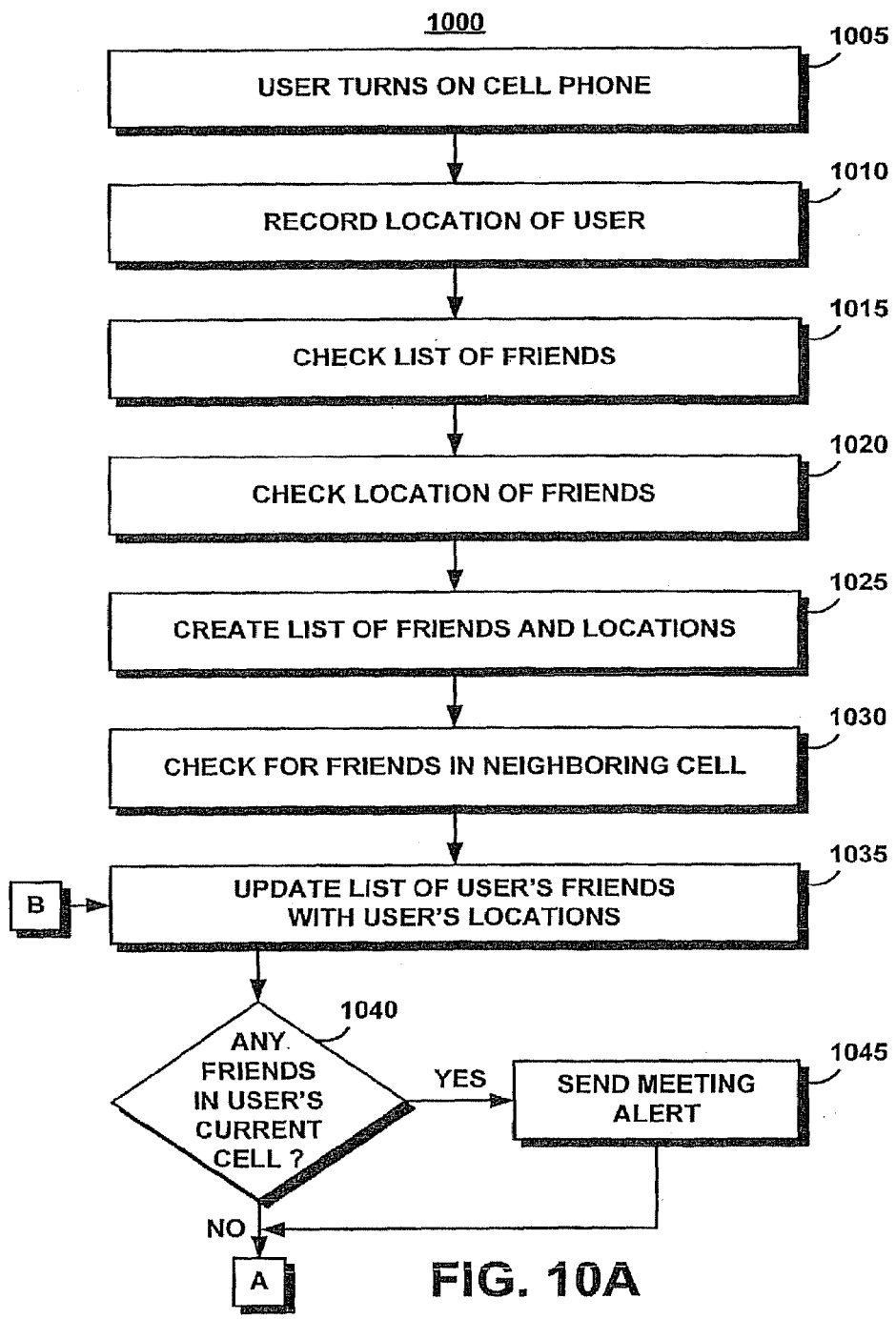
FIG. 10 is comprised of FIGS. 10A and 10B, and represents a process flow chart illustrating a method of operation of an alternate embodiment of the proximity detection system of FIGS. 1 and 2.
Figure 10B:
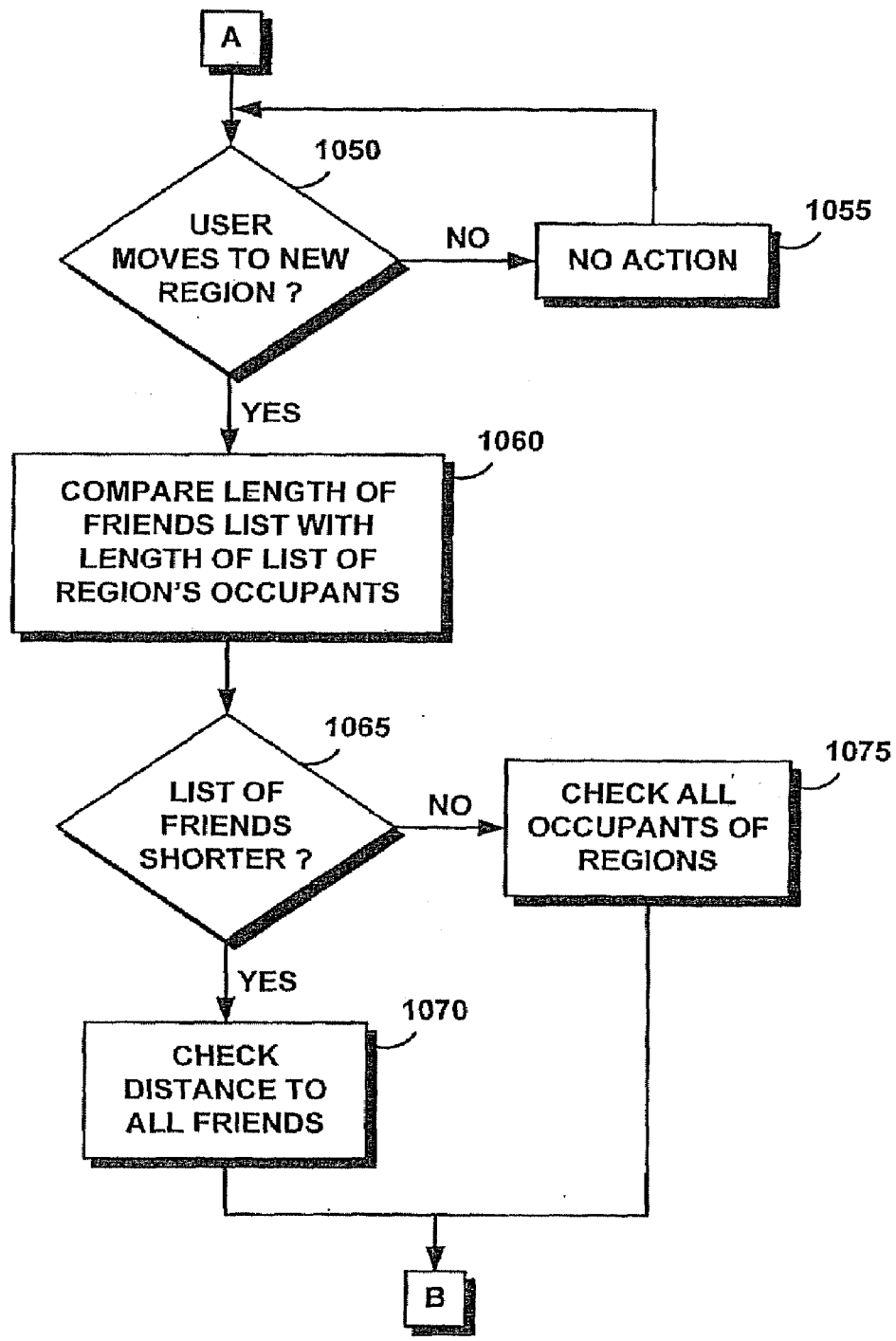

FIG. 10 (FIGS. 10A, 10B) illustrates the method 1000 of the alternate embodiment of system 10 for detecting proximity between mobile users. At block 1005, the user turns on their cell phone, registering with system 10. System 10 records the location of the user (block 1010) and checks the user's list of friends (block 1015).

With reference to FIGS. 11A, 11B, 12A, and 12B, each of the friends of the user a is listed in one of several lists, located at the quadtree nodes along the path from the leaf that contains user a and up to the root. The friend $b_i$ is listed at the first common ancestor of a and b.

Figures 11A, 11B:
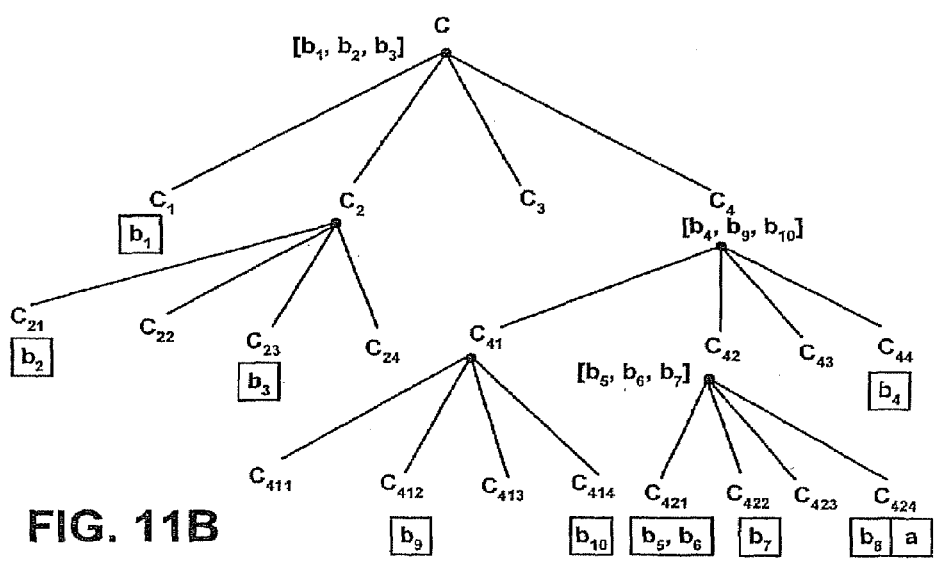
FIGS. 11A and 11B represent an example illustrating a quadtree and lists of friends for a user with ten friends, before the user moves.
Figures 12A, 12B:
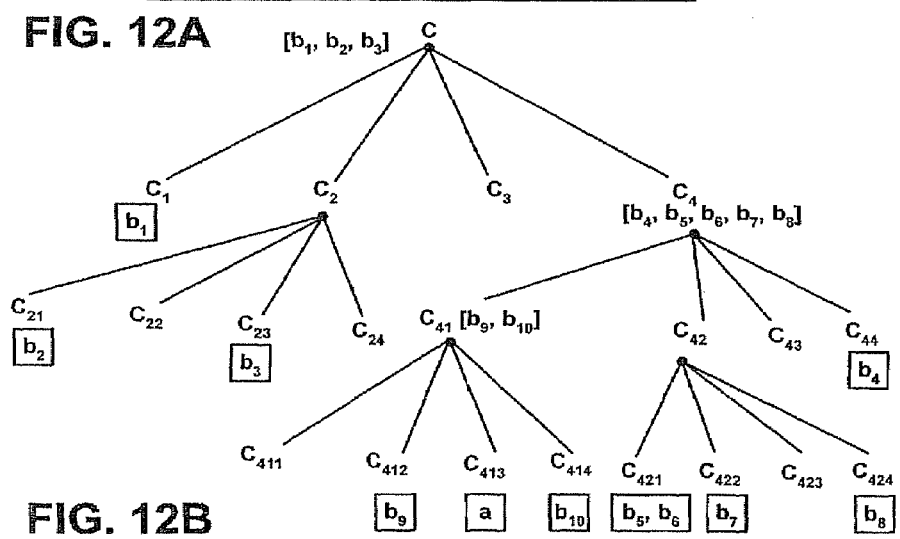

Considering FIG. 11A, it illustrate the user a and his ten friends, b1, . . . , b10. The corresponding quadtree is illustrated, and the lists of friends are found at the nodes C, C4, C42 and C424. For example, friend B9 is listed at node C4 because C4 is the first place where the path from C412, where B9 is located, merges with the path from C424, where user a is located.

Continuing now with FIG. 10A, system 10 then checks the location of the friends (block 1020), and creates a list of friends together with the friend's locations (block 1025). At block 1030, system 10 checks for friends in any neighboring regions. System 10 updates the location of the user on any lists that has the user listed as a friend (block 1035). At decision block 1040, system 10 determines if any friends are located in the user's current region. If so, system 10 sends a meeting alert to those friends at block 1045.

Considering FIG. 11B, when a user moves from one region to another, the data structure is updated and alert messages are generated, if necessary. For example, FIG. 11B illustrates the quadtree and the lists of friends after user a moves from C424 to C413. The list of friends at node C does not need to be updated, as user a remains in the same child C4 of node C. The lists at C424 and C42 are cleared from friends of user a, as those nodes are no longer on the path from user a to the root. Instead, new lists are generated at C41 and C413. The list at C4 is updated. Friend b4 remains, while friends b9 and b10 move to the list at C41, and friends b5, b6, b7, and b8 are added to the list.

The algorithm corresponding to FIGS. 11A, 11B, 12A, and 12B, can be summarized in the following pseudo code:

```
InitEmpty(T) {
    T=empty leaf;
    T's friendship list = empty;
}
// Split is called when there are exactly two items in one cell, and
// cell size is larger than R.
Split(leaf, T) {
    split leaf into four new leaves (quadrants) , with new empty
    friendship lists.
    move each guy to its corresponding leaf.
    if they both fall into the same leaf
        if (leaf size > R), split(that leaf)
        else add their friendship rule to the leaf's friendships list. // small
leaf, cannot split anymore
    else
        If the two items are friends, add their friendship to the father's
        friendship list.
    }
}
// merge is called when there is only one item left in all four brothers
```

```
-continued

MergeSonsOf(node, T) {
    move guy to father.
    delete four children.
    // note that friendship list of the father is already empty
}
Insert(a new guy, guy's location, T) {
    leaf = apply point location to find the corresponding leaf.
    add guy to leaf
    insert all his friendships into the leaf's and his ancestor's friendship
lists, along the path to root.
    if leaf contains more than one guy and is larger than R,
        split(leaf)
}
Delete(an existing guy, T) {
    delete guy from leaf
    delete guy's friendships from the leaf's and his ancestor's friendship
lists, along the path to root.
    if total number of guys under the father's tree is one, merge (father)
}
// Data structure L( a, T ) is a list of friends of a stored at node T.
Move(an existing guy A, old node T1, new node T2 ) {
    T = find_lowest_common_ancestor( T1, T2)
    For (every node T' on the path in the tree from T to T1) {
        For every friend b in L(a, T){
            Update( b ) about a's new location
        }
        Add all elements of L( a , T' ) to L(a , T)
    }
    For (every node T' on the path in the tree from T to T2) {
        Move to L(a, T') the nodes of L(a, T) that should be located in
        L(a, T')
    }
    Let X be the list of the 8-neighbor leaf cells of T2, which are
                neither T1 nor one of T1's 8-neighbor leaf cells.
    Find T3, the lowest common ancestor of T2 and X
    For each friend b in L(a, T3){
        if (‖ a – b ‖ < R) Send_Proximity_Alert(a,b)
    }
}
```

As long as the user does not move to a new region (decision block 1050, FIG. 9B), no additional action is taken (block 1055). If the user moves to a new region, the alternate embodiment of system 10 compares the length of the list of friends with the length of the list of the region's current occupants (block 1060). If the list of friends is the shorter list (decision block 1065), system 10 checks the distance to all the friends on the list (block 1070). Otherwise, system 10 checks all the occupants of the region to determine if they are on the user's friends list (1075). System 10 then repeats blocks 1035 through 1075 as long as the user's cell phone is active.

It is to be understood that the specific embodiments of the invention that have been described are merely illustrative of certain application of the principle of the present invention. Numerous modifications may be made to the system and method for detecting proximity between mobile users invention described herein without departing from the spirit and scope of the present invention.

What is claimed is:

1. A method for detecting proximity between at least a first mobile device and a second mobile device, comprising:
   determining a position of the first and second mobile devices;
   automatically notifying any of the first mobile device or the second mobile device in response to a relative position between the first and the second mobile devices;
   defining the relative position by a space that is partitioned into a first region, a second region, and a third region;

defining the first region relative to the first mobile device;
defining the second region relative to the second mobile device;
wherein the third region forms a boundary region between the first region and the second region; and
wherein automatically notifying occurs if:
  at least any of the first and second mobile devices enters the third region; and
  the relative position is determined to be less than a predetermined value.

2. The method of claim 1, wherein the first and second mobile devices comprise handheld telecommunication devices.

3. The method of claim 1, wherein automatic notification is implemented by a central communications authority.

4. The method of claim 1, wherein automatic notification is implemented by any one of the first mobile device or the second mobile device.

5. The method of claim 1, further comprising determining whether any one of the first or the second mobile device is moving.

6. The method of claim 5, wherein the location of the first mobile device is fixed.

7. The method of claim 6, wherein the relative position is determined to be less than the predetermined value if the second mobile device has crossed the third region.

8. The method of claim 1, further comprising determining if the first mobile device has received a location notification from the second mobile device.

9. The method of claim 8, further comprising checking the relative position of the first mobile device with associated mobile devices.

10. The method of claim 9, further comprising transmitting the location of the first mobile device to the associated mobile devices.

11. The method of claim 1, further comprising sending an alert message from the first mobile device to the second mobile device;
  wherein the second mobile device temporarily blocks the alert message; and
  if desired, selectively delaying a retrieval of the alert message by the second mobile device, or deleting the alert message.

12. The method of claim 9, comprising comparing the distance between the first mobile device and the second mobile device to the predetermined value.

13. The method of claim 12, further comprising sending an alert message from the first mobile device to the second mobile device if the distance is less than the predetermined value.

14. The method of claim 1, further comprising setting data structure and boundary definitions relating to the second mobile device.

15. The method of claim 14, further comprising updating the data structure and boundary definitions for the second mobile device if a distance between the first mobile device and the second mobile device is greater than the predetermined value.

16. The method of claim 1, wherein each of the first and second regions is divided into a plurality of regions.

17. The method of claim 1, further comprising determining if any of the first region or the second region contains a user.

18. The method of claim 17, wherein any one of the first region or the second region is divided into a plurality of regions if it contains at least one user.

19. A computer program product having instruction codes for detecting proximity between at least a first mobile device and a second mobile device, comprising:
  a first set of instruction codes for determining a position of the first and second mobile devices;
  a second set of instruction codes for automatically notifying any of the first mobile device or the second mobile device in response to a relative position between the first and the second mobile devices;
  a third set of instruction codes for defining the relative position by a space that is partitioned into a first region, a second region, and a third region;
  wherein the third set of instruction codes further defines the first region relative to the first mobile device;
  wherein the third set of instruction codes further defines the second region relative to the second mobile device;
  wherein the third region further forms a boundary region between the first region and the second region; and
  wherein the second set of instruction codes automatically notifies any of the first mobile device or the second mobile device, if:
    at least any of the first and second mobile devices enters the third region; and
    the relative position is determined to be less than a predetermined value.

20. A system for detecting proximity between at least a first mobile device and
a second mobile device, comprising:
  means for determining a position of the first and second mobile devices;
  means for automatically notifying any of the first mobile device or the second mobile device in response to a relative position between the first and the second mobile devices;
  means for defining the relative position by a space that is partitioned into a first region, a second region, and a third region;
  wherein the means for defining the relative position defines the first region relative to the first mobile device, and further defines the second region relative to the second mobile device;
  wherein the third region forms a boundary region between the first region and the second region; and
  wherein the means for automaticaUy notifying, provides notification to any of the first mobile device or the second mobile device, if:
    at least any of the first and second mobile devices enters the third region; and
    the relative position is determined to be less than a predetermined value.

* * * * *